United States Patent [19]

Green et al.

[11] Patent Number: 5,035,679
[45] Date of Patent: Jul. 30, 1991

[54] BELT TENSIONER AND METHOD OF MAKING THE SAME

[75] Inventors: Nancy M. Green; Mark P. Foley, both of Springfield, Mo.

[73] Assignee: Dayco Products, Inc., Dayton, Ohio

[21] Appl. No.: 626,088

[22] Filed: Dec. 11, 1990

Related U.S. Application Data

[60] Continuation-in-part of Ser. No. 513,718, Apr. 24, 1990, which is a division of Ser. No. 403,537, Sep. 6, 1989, Pat. No. 4,938,734.

[51] Int. Cl.$^5$ ............................................. F16H 7/08
[52] U.S. Cl. .................................................. 474/135
[58] Field of Search ...................... 474/101, 109–111, 474/113–117, 133, 135, 136, 138

[56] References Cited

U.S. PATENT DOCUMENTS

| | | | |
|---|---|---|---|
| 4,596,538 | 6/1986 | Henderson | 474/135 |
| 4,661,087 | 4/1987 | Henderson | 474/135 |
| 4,784,631 | 11/1988 | Henderson | 474/135 |
| 4,832,666 | 5/1989 | Henderson | 474/135 |
| 4,902,267 | 2/1990 | Henderson | 474/135 X |
| 4,938,734 | 7/1990 | Green et al. | 474/135 |

Primary Examiner—Thuy M. Bui
Attorney, Agent, or Firm—Joseph V. Tassone

[57] ABSTRACT

A belt tensioner and method of making the same are provided, the tensioner comprising a support for being fixed relative to a belt, a belt engaging unit carried by the support and being movable relative thereto, a spring operatively associated with the support and the belt engaging unit for urging the belt engaging unit relative to the support and against the belt with a force to tension the belt, and a frictional dampening unit operatively associated with the support and the belt engaging unit to dampen the movement of the belt engaging unit relative to the support, the dampening unit comprising a pair of frictionally engaging first and second parts with the first part comprising an annular pad of friction material that is coaxially disposed and axially movable on a shaft of the support relative to the second part, and a second spring urging the first part against the second part with a certain spring force, the first part of the dampening unit having a guide thereon, one of the support and the belt engaging unit having an opening therein that receives the guide therein to guide axial movement of the first part, the annular pad and the guide of the first part of the dampening unit comprising a one-piece homogeneous member.

16 Claims, 4 Drawing Sheets

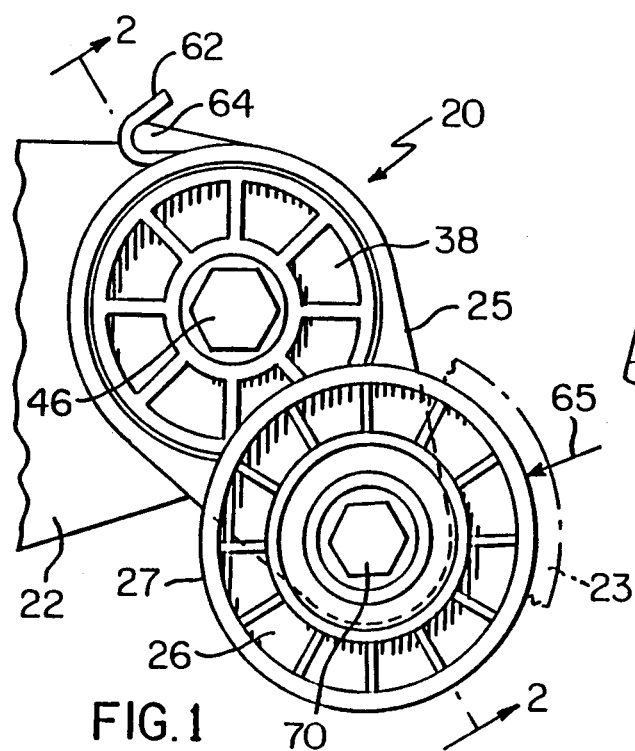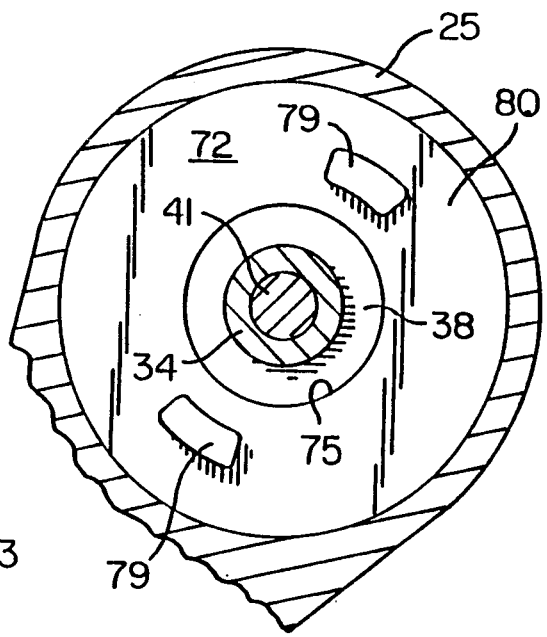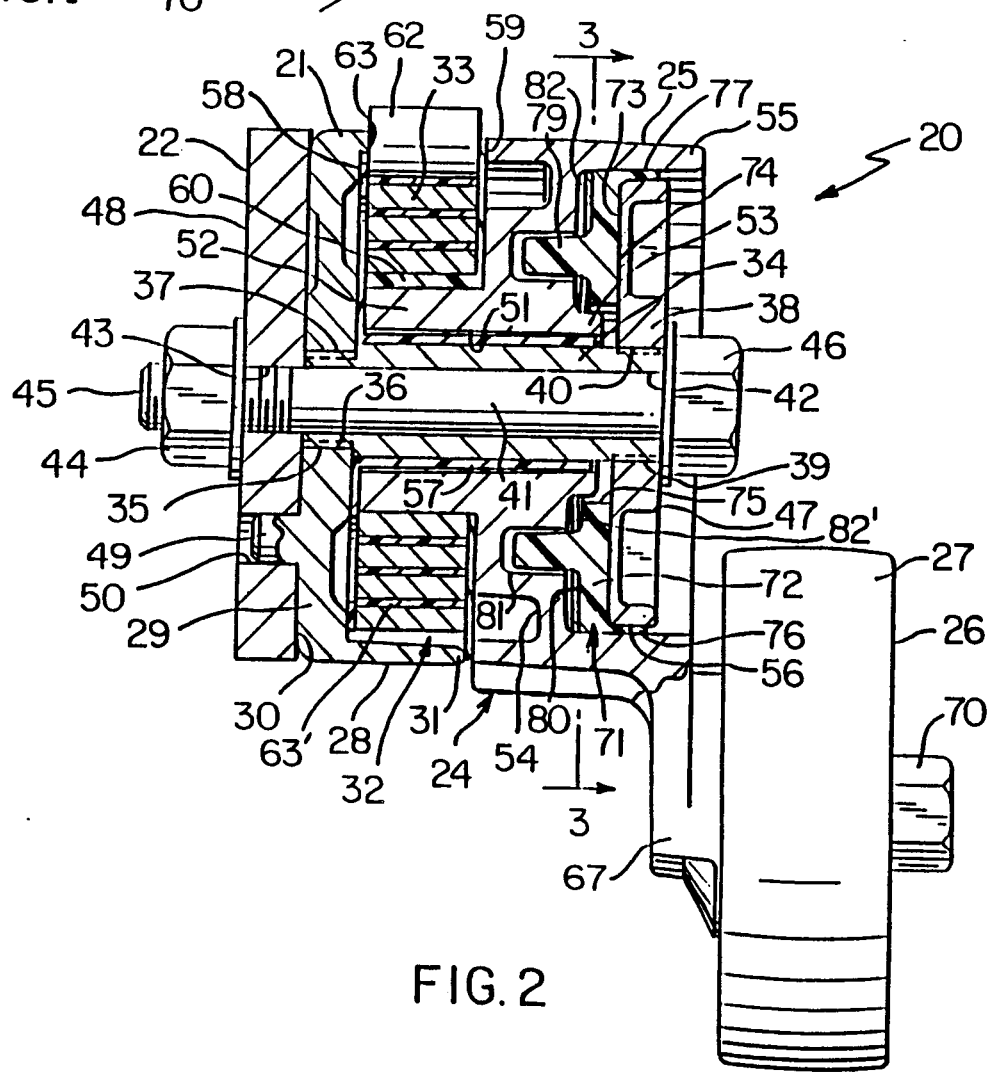
FIG. 1
FIG. 3
FIG. 2

BELT TENSIONER AND METHOD OF MAKING THE SAME

CROSS REFERENCE TO RELATED APPLICATIONS

This application is a continuation-in-part patent application of its copending parent U.S. patent application, Ser. No. 513,718, filed Apr. 24, 1990, which, in turn, is a divisional patent application of its copending parent U.S. patent application, Ser. No. 403,537, filed Sept. 6, 1989, now U.S. Pat. No. 4,938,734.

BACKGROUND OF THE INVENTION

1. Field of the Invention

This invention relates to a new tensioner for a power transmission belt or the like and to a new method of making such a tensioner.

2. Prior Art Statement

It is known to provide a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, the portion of the belt engaging means having opening means therein that receive the guide means therein to guide axial movement of the first part wherein the first part of the dampening means rotates in unison with the portion of the belt engaging means, the annular pad and the guide means of the first part of the dampening means comprising a one-piece homogeneous member, the second part of the dampening means comprising an end plate secured to the shaft means whereby the end plate remains stationary with the support means as the first part rotates with the belt engaging means relative thereto, the end plate having a cylindrical outer periphery, the portion of the belt engaging means having a cylindrical part disposed substantially concentrically about the cylindrical outer periphery of the end plate, the first part of the dampening means comprising a tubular sleeve-like means disposed between the cylindrical outer periphery of the end plate and the cylindrical part of the belt engaging means to act as a bushing therebetween. For example, see the aforementioned parent U.S. Pat. No. 4,938,734 to Green et al.

SUMMARY OF THE INVENTION

It is one feature of the invention set forth in the aforementioned parent U.S. Pat. No. 4,938,734, to provide a new belt tensioner having a reduced number of parts with the remaining parts performing all of the functions of the prior known tensioner having dampening means.

In particular, it was found according to the teachings of the invention set forth in the aforementioned parent U.S. Pat. No. 4,938,734, that the annular friction pad, the force plate for the friction pad and an end plate bushing could be combined into a single member that would function in the same manner as the components replaced thereby whereby it is believed that an improvement will result in the production costs for the tensioner as fewer production parts and less time is required for the assembly thereof.

For example, one embodiment of the invention set forth in the aforementioned parent U.S. Pat. No. 4,938,734, provides a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, one of the support means and the belt engaging means having opening means therein that receive the guide means therein to guide axial movement of the first part, the annular pad and the guide means of the first part of the dampening means comprising a one-piece homogeneous member.

It is one feature of this invention to provide a unique arrangement of the guide means and the opening means therefor.

In particular, it was found according to the teachings of this invention that the guide means can project outwardly from a tubular sleeve-like means of the annular pad and the opening means therefor can be disposed in a cylindrical part of the belt engaging means.

For example, one embodiment of this invention comprises a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, the portion of the belt engaging means having opening means therein that receive the guide means therein to guide axial movement of the first part whereby the first part of the dampening means rotates in unison with the portion of the belt engaging means, the annular pad and the guide means of the first part of the dampening means comprising a one-piece homogeneous member, the second part of the dampening means comprising an end plate secured to the shaft means whereby the end plate remains stationary with the support means as the first part rotates with the belt engaging means relative thereto, the end plate having a cylindrical outer periphery, the portion of the belt engaging means having a cylindrical part disposed substantially concentrically about the cylindrical outer periphery of the end plate, the first part of the dampening means comprising a tubular sleeve-like means disposed between the cylindrical outer periphery of the end plate and the cylindrical part of the belt engaging means to act as a bushing therebetween, the guide means projecting outwardly from the tubular sleeve-like means, the opening means that receive the guide means therein being disposed in the cylindrical part of the belt engaging means.

It is another feature of the invention set forth in the aforementioned parent U.S. Pat. No. 4,938,734 to utilize such unique one-piece member of the dampening means of the belt tensioner to tend to reduce the belt engaging means from tending to cock on its shaft means due to the force of the belt being tensioned thereby acting on the pulley means of the belt engaging means in an offset relation to the shaft means for the belt engaging means.

In particular, it was found that when a pulley means of a belt engaging means of a belt tensioner has the belt engaging surface thereof disposed outside the axial length of the shaft means that carries the belt engaging means, there is a tendency of the belt engaging means to cock on the shaft means and thereby tend to rapidly wear out the bushing means of the shaft means that is disposed between the shaft means and the belt engaging means to facilitate rotatable movement therebetween.

However, it was found according to the teachings of the invention set forth in the aforementioned parent U.S. Pat. No. 4,938,734 that the unique one-piece member of the dampening means of the tensioner can cooperate with the belt engaging means and the end plate or end cap of the belt tensioner in such a manner that the end plate tends to prevent adverse cocking of the belt engaging means on its shaft means as will be apparent hereinafter.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a front view of the new belt tensioner of this invention.

FIG. 2 is an enlarged fragmentary cross-sectional view taken on line 2—2 of FIG. 1 and illustrates the tensioner of this invention mounted to a suitable support structure.

FIG. 3 is a fragmentary cross-sectional view taken on line 3—3 of FIG. 2.

DESCRIPTION OF THE PREFERRED EMBODIMENTS

Figure 4:
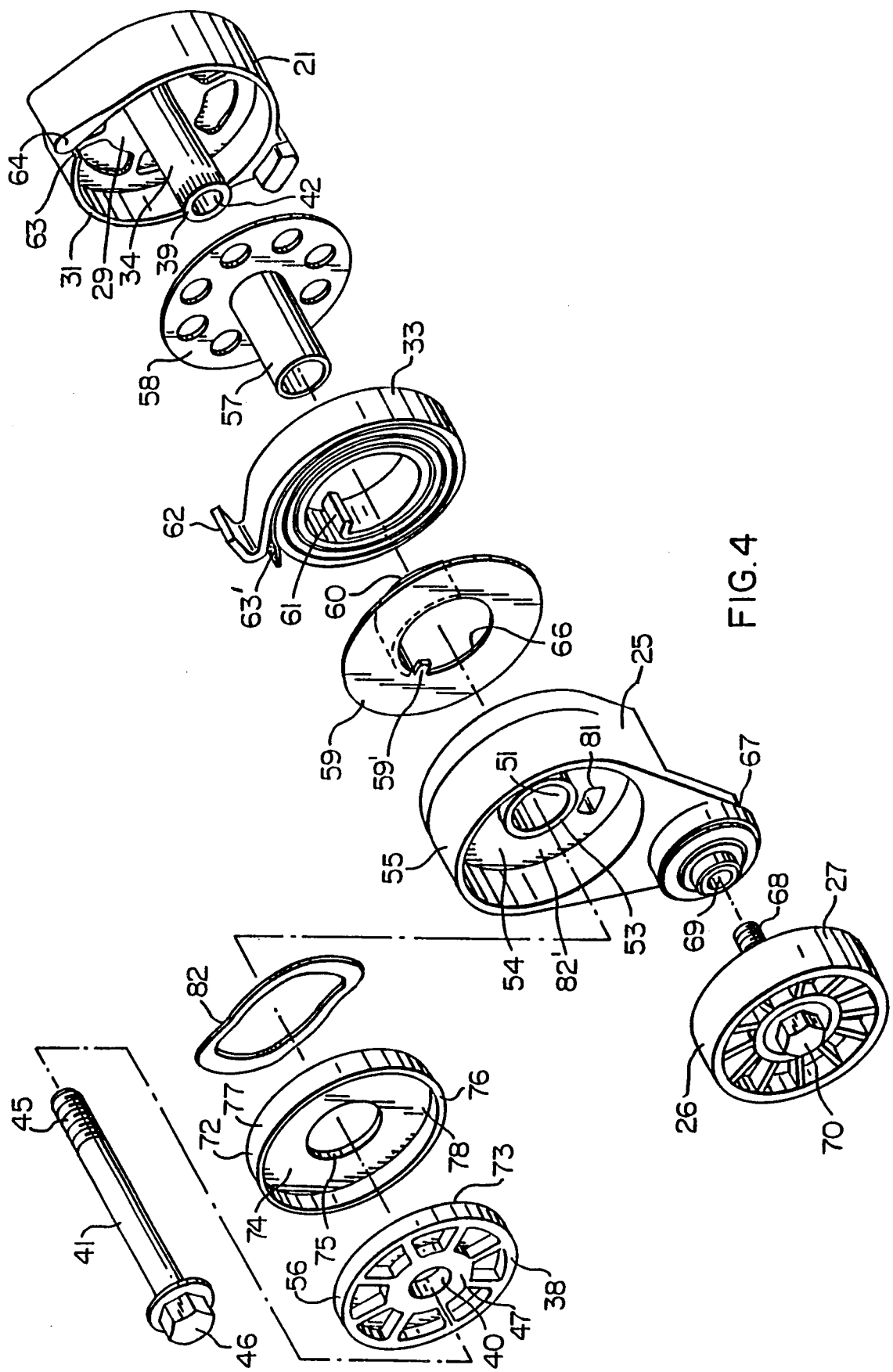
FIG. 4 is an exploded perspective view of the various parts that form the belt tensioner of FIGS. 1-3.

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired.

Therefore, this invention is not to be limited to only the embodiments illustrated in the drawings because the drawings are merely utilized to illustrate one of the wide variety of uses of this invention.

Referring now to FIGS. 1, 2 and 3, the new tensioner of this invention is generally indicated by the reference numeral 20 and comprises a support means 21 that is fixed to mounting structure 22, such as a support bracket for an internal combustion engine (not shown) of a transportation vehicle (not shown) or the like so that the support means 21 is fixed from movement relative to a power transmission belt 23 that is adapted to be operated in an endless path and that is illustrated by dashed lines in FIG. 1, the belt tensioner 20 also comprising a belt engaging means that is generally indicated by the reference numeral 24 and comprising a belt engaging arm or portion 25 that is rotatably mounted on the support means 21 in a manner hereinafter set forth and carrying a rotatable pulley 26 having an external peripheral surface 27 adapted to engage the belt 23 to tension the same in a manner and for reasons well known in the art. For example, see the U.S. Patent No. 4,596,538, to Henderson, which patent is being incorporated into this disclosure by this reference thereto.

Thus, since in general, the structure and operation of the tensioner 20 of this invention is well known in the art, only the details believed necessary to understand the unique features of this invention will now be described.

The support means 21 comprises a generally cup-shaped housing member 28 having a closed end wall 29 that is adapted to abut against a surface 30 of the mounting structure 22 and having an open end 31 which defines a chamber 32 therein for receiving a torsion spring 33 in a manner hereinafter set forth for providing the tensioning force on the belt 23 in a manner well known in the art.

The support means 21 also comprises a tubular shaft means 34 that has one end 35 disposed in an opening 36 of the end wall 29 of the cup-shaped housing member 28 and being secured therein in any suitable manner, such as by the press-fit knurling means that is indicated by the reference numeral 37 in FIG. 2 as the cup-shaped housing member 21 and tubular shaft means 34 are formed of any suitable metallic material. Thus, the shaft means 34 is fixed from rotating relative to the housing member 28.

The support means 21 also comprises a metallic end plate or end cap 38 that is secured to the other end 39 of the shaft means 34 in any suitable manner, such as by the end 39 being knurled and press fitted into an opening 40 passing centrally through the end cap 38 whereby the end plate 38 is fastened to the shaft means 34, so as to not rotate relative thereto and, thus, to the cup-shaped member 28 which is fixed from rotating relative to the mounting structure 22 by having a single bolt 41 pass through a central opening 42 through the shaft means 34 as well as through an aligned opening 43 in the mounting structure 22 to have a suitable nut means 44 threaded onto its threaded end 45 to compact an enlarged head means 46 of the bolt 41 against a side 47 of the end plate 38 while the nut means 44 compacts against a rear side 48 of the mounting structure 22 in a manner well known in the art. In order to prevent the support means 21 from rotating on the single bolt means 41, the cup-shaped member 28 has a projection means 49 extending rearwardly therefrom and being received in an opening 50 formed through the mounting structure 22 in offset relation to the bolt opening 43 thereof whereby the projection 50 prevents the support means 21 from rotating relative to the mounting structure 22 on the single bolt means 41 in a manner well known in the art.

The belt engaging portion or arm 25 has an opening 51 passing centrally therethrough with the portion 25 thereby defining opposed aligned tubular hub portions 52 and 53 extending outwardly from opposite sides of an intermediate web-like portion 54 that integrally interconnects with an outer peripheral cylindrical portion 55 that is disposed in a concentric manner about an outer peripheral portion 56 of the end plate 38 when the portion 25 of the belt engaging means 24 is telescoped onto the shaft means 34 in the assembled relation illustrated in FIG. 2.

In this manner, the portion 25 of the belt engaging means 24 substantially closes the open end 31 of the cup-shaped support member 28 to confine the torsion spring 33 therein.

However, a bearing sleeve 57 formed of any suitable anti-friction material, such as polymeric material is telescoped on the shaft means 34 so as to provide a bearing means between the shaft means 34 and the portion 25 of the belt engaging means 24, the bearing means 57 being integral with a disc-like plate 58 which is disposed between the torsion spring 33 and the end wall 29 of the cup-shaped member 28 to provide anti-friction means between the torsion spring 33 and the end wall 29.

Likewise, a disc-like member 59 of any suitable anti-friction material, such as polymeric material, is disposed between the belt engaging portion 25 of the belt engaging means 24 and the torsion spring 33 to tend to reduce the friction between the belt engaging portion 25 and the torsion spring 33 during operation of the tensioner 20. The disc member 59 may have an integral protection member 60 extending from one side thereof to cooperate with the torsion spring 33 in a manner fully set forth in the aforementioned U.S. Pat. No. 4,596,583 to Henderson.

In particular, the metallic torsion spring 33 is coiled in a spiral relation to define an inner end 61 thereof and an outer end 62 thereof and can have a strip of anti-friction material 63' interleaved between the coils thereof in a manner well known in the art, the torsion spring 33 being disposed in the chamber 32 of the housing means 28 and having its inner end 61 operatively interconnected to the belt engaging arm 25 by being received in a suitable slot (not shown) formed in the tubular hub portion 52 thereof while the other end 62 of the torsion spring 33 extends out of a slot means 63 of the housing means 28 and hooks over the edge means 64 thereof so as to operatively interconnect the spring 33 to the support means 21. If desired, a suitable flexure closure member (not shown) can thereafter be disposed in the slot means 63 to close the same.

In this manner, the torsion spring 33 can initially be so wound that the same always tends to rotate the belt engaging arm 25 in a counterclockwise direction when viewing the tensioner in FIG. 1 whereby it can be seen that the belt 23 being tensioned by such counterclockwise movement of the belt engaging arm 25 imposes a load on the pulley 26 that is represented by the arrow 65 in FIG. 1.

The disc-like member 59 of anti-friction material has a central opening 66 passing therethrough so as to be telescoped onto the hub portion 52 of the belt engaging arm 25 and thereby be disposed between the portion 25 of the belt engaging means 24 and the torsion spring 33 so as to facilitate movement therebetween, the protective member 60, if used, of the disc-like member 59 being disposed under the first coil of the torsion spring 53 adjacent the end 61 thereof to prevent cracking of the torsion spring 33 all for the reasons that are fully set forth in the aforementioned U.S. Pat. No. 4,596,538, to Henderson, and need not be further described.

In order to fix the member 59 from rotating relative to the belt engaging portion 25, the member 59 may have a tang 59' that is received in the previously described spring receiving slot (not shown) in the hub portion 52 of the belt engaging portion 25.

The pulley 26 is rotatably mounted to an end 67 of the belt engaging arm 25 by having a threaded shaft means 68 thereof passing through an opening means 69 of the belt engaging arm means 24 and being secured thereto by a nut means 70 so that the pulley 26 can rotate on its shaft means relative to the belt engaging means 24 in a manner conventional in the art.

The tensioner 20 has frictional dampening means that is generally indicated by the reference numeral 71 in FIG. 2 and that is utilized to tend to retard rotary movement of the belt engaging portion 25 on the shaft means 34 for reasons well known in the art, such as fully set forth in the aforementioned U.S. Pat. No. 4,596,538 to Henderson.

The friction dampening means 71 comprises a unique one-piece member 72 of this invention that is formed of any suitable material that can act as a pad of friction material when the same is spring urged against a flat annular surface 73 of the end plate 38 as will be apparent hereinafter. For example, the member 72 can be formed of a suitable polymeric material, such as Nylastron GS-51 sold by The Polymer Corporation of Reading, Pa.

Thus, while the material forming the member 72 of this invention is normally used as an anti-friction material for bushings and the like, it has been found that the same will act as a friction material when being spring urged or compressed between relatively moving members as will be apparent hereinafter.

The member 72 is substantially cup-shaped and has a closed end wall disc portion 74 provided with a central opening 75 passing therethrough so as to permit the member 72 to be telescoped onto the tubular hub portion 53 of the belt engaging portion 25 as illustrated, the member 72 having an open end 76 that defines a sleeve-like cylindrical portion 77 at the outer peripheral end 78 of the disc portion 74 thereof. The sleeve-like portion 77 of the member 72 is adapted to be disposed between the cylindrical portion 55 of the belt engaging portion 25 and the outer peripheral surface 56 of the end cap 38 in an intimate manner therewith so as to tend to prevent the belt engaging portion 25 from tending to cock on the shaft means 34 because of the pulley 26 being offset out of alignment with the shaft means 34.

In particular, it was found that the force load 65 of the belt 23 on the pulley 26 tends to cause the belt engaging portion 25 to cock on the shaft means 34 of the support means 21 and, thus, adversely wear out the bearing means 57, such cocking of the arm means 25 being particularly noticeable when the belt engaging surface 27 of the pulley 26 is offset out of the axial length of the shaft means 34 as is relatively apparent when viewing the tensioner 20 in the position of FIG. 2 thereof.

However, it was found according to the teachings of this invention that such adverse cocking of the arm means 25 can be prevented if the sleeve-like portion 77 of the member 72 of this invention is in intimate contact between the cylindrical portion 55 of the belt engaging means 25 and the outer peripheral surface 56 of the end plate 38 so as to counter the belt force 65 and hold the arm means 25 from cocking on the shaft means 34 even though the load force 65 is offset relative to the shaft means 34.

It was also found according to the teachings of this invention that when the sleeve-like portion 77 is being compressed between the portion 55 of the belt engaging arm 24 and the outer peripheral 56 of the end plate 38 by the belt force tending to cock the arm means 25 on the shaft means 34, the thus compressed sleeve 77 tends t retard rotary movement of the belt engaging means 24 with such friction dampening means being particularly useful to prevent wearing out of the tensioner 20 for the reasons that are fully set forth in the aforementioned U.S. Pat. No. 4,596,538, to Henderson, and need not be further described except to state that such friction dampening means of the sleeve 77 is in addition to the normal friction dampening means provided by the member 72 engaging against the surface 73 of the end plate 38 in a manner now to be described.

The member 72 has a plurality of guide projections 79 formed in a circular array on a side 80 of the member 72 and are respectively adapted to be received in openings 81 also formed in a circular array in a side 82' of the web portion 54 of the belt engaging means 24 in the manner illustrated in FIG. 2 so that the member 72 rotates with the belt engaging means 24 while being axially movable relative thereto through the action of the guides 79 in the openings 81.

Thus, a suitable spring means, such as the wavy spring means 82 illustrated in the drawings, is disposed between the member 72 and the side 82' of the belt engaging portion 25 to continuously urge the member 72 in a direction to place the inner surface of the closed end wall 74 thereof into frictional engagement with the surface 73 of the end plate 38 to provide for a friction dampening of the rotary movement of the belt engaging means 25 relative to the end plate 38 for the reasons previously set forth.

Therefore, it can be seen that the member 72 of this invention eliminates the need for a separate annular pad of friction material, a separate force plate means for such annular pad and a separate bearing means between the belt engaging portion and the end plate as required in the aforementioned U.S. Pat. No. 4,596,538 to Henderson.

Also, it can be seen that such unique member 72 of this invention not only performs a dampening function by being urged by the spring means 82 into frictional engagement with the surface 73 of the end plate means 38 to tend to retard rotary movement of the belt engaging means 25, but also the sleeve-like portion 77 of the member 72 of this invention tends to prevent cocking of the belt engaging portion 25 on the shaft means 34 to tend to prevent wearing out of the bearing means 57 as well as to provide a friction dampening means between the cylindrical part 55 of the belt engaging portion 25 and the outer peripheral surface 56 of the end plate 38 for the reasons previously set forth.

While the unique member or annular pad 72 of this invention has the guide means or projections 79 thereof extending from the side 80 of the member 72, it is to be understood that such guide means could be located on other portions of the member 72 in lieu of extending from the side 80 thereof or even be in addition thereto, if desired.

Figure 5:
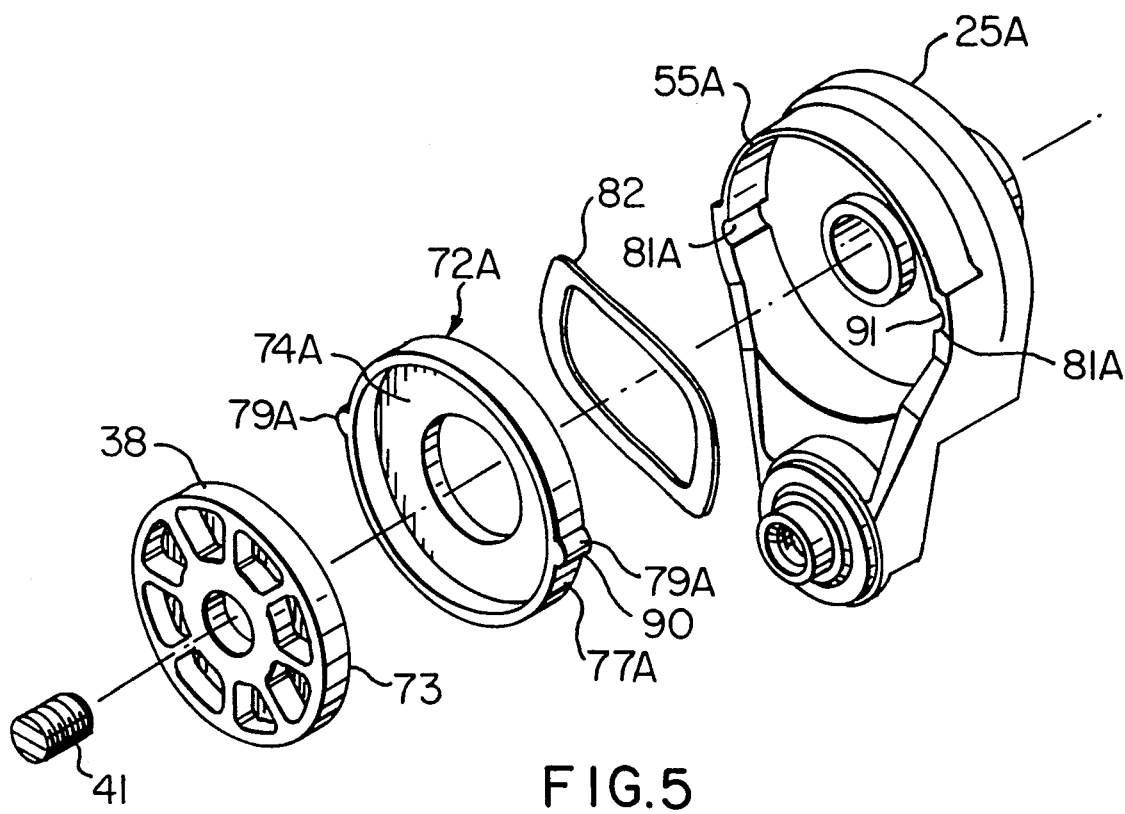
FIG. 5 is an exploded perspective view of various parts that can form another tensioner of this invention that is similar to the tensioner of FIGS. 1-4.
Figure 6:
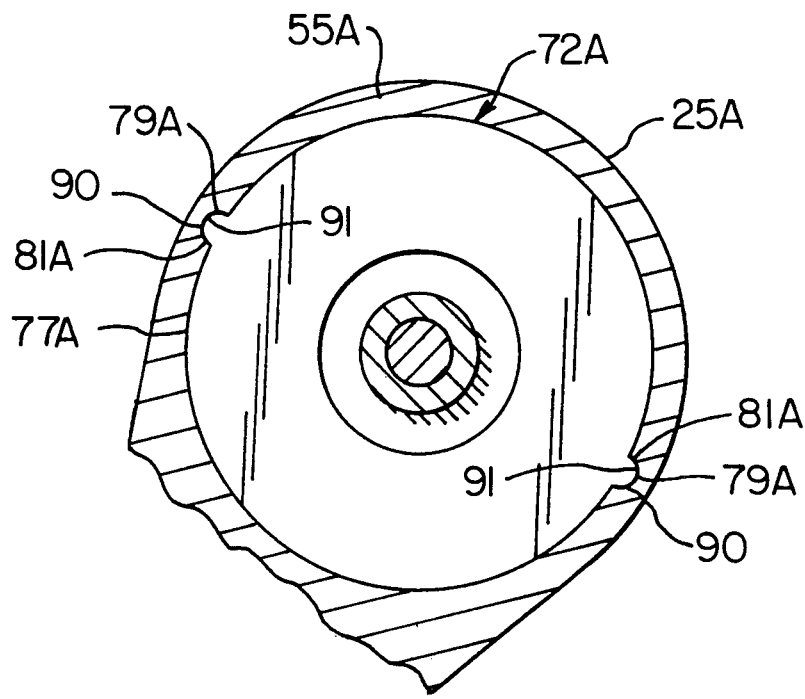
FIG. 6 is a view similar to FIG. 3 and illustrates the support means of FIG. 5.

For example, another unique member or annular pad of this invention is generally indicated by the reference numeral 72A in FIG. 5 to cooperate with the various parts of the tensioner 20 previously described and requiring only the housing member 25A to be changed in a manner hereinafter set forth and as illustrated in FIGS. 5 and 6.

In particular, it can be seen that the member 72A of FIG. 5 is adapted to have the annular pad surface 74A thereof urged against the surface 73 of the end plate 38 by the wavy spring means 82 in the manner previously set forth and the axial movement of the member 72A is guided by the outwardly directed guide projections 79A that are formed in a circular array to project radially outwardly from the sleeve-like portion 77A of the member 72A as illustrated in FIG. 5, two such guide means or projections 79A being illustrated and being disposed diametrically opposite each other with it being understood that one or more projections 79A can be utilized, if desired.

The cylindrical part 55A of the belt engaging portion 25A has cooperating openings 81A formed therein to receive the projections 79A when the belt engaging portion 25A and the member 72A are assembled together with the other parts of the tensioner 20 in the manner previously set forth.

The guide means 79A each have rounded free ends 90 while the openings 81A in the belt engaging portion 25A each have rounded bottoms 91 that respectively receives a rounded free end 90 of a projection 79A therein.

Of course, it is to be understood that the projections 79A could have many other suitable configurations, if desired.

Figure 7:
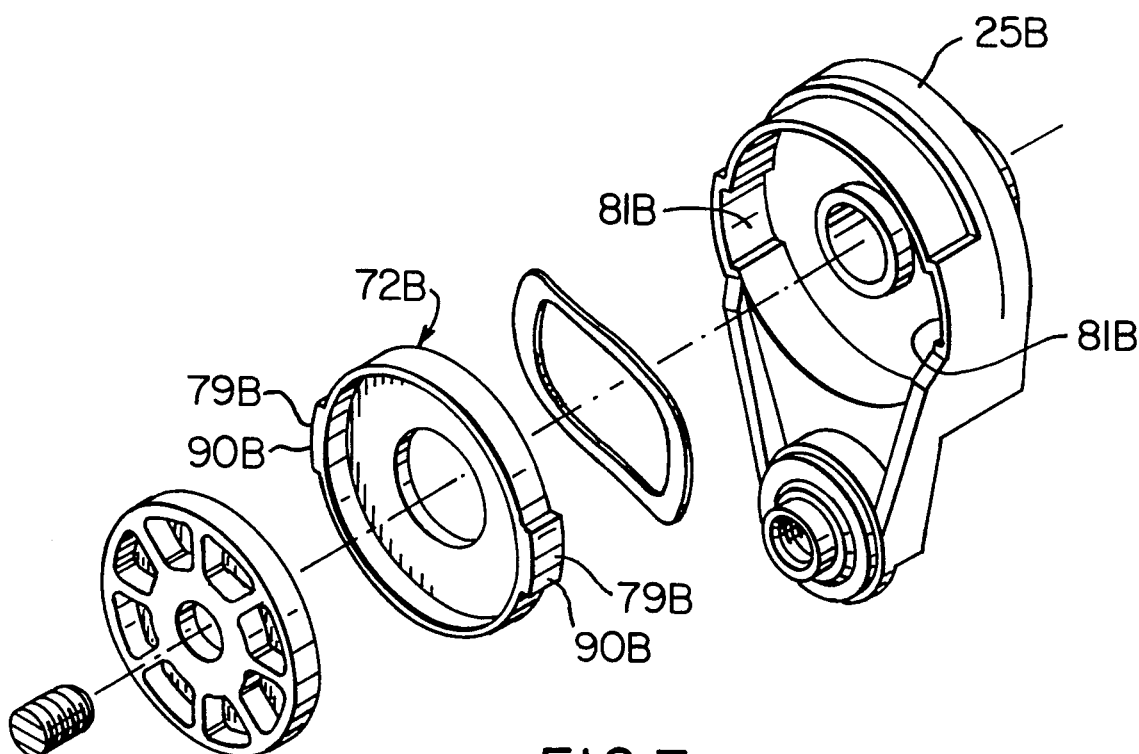
FIG. 7 is an exploded perspective view of various parts that can form another tensioner of this invention that is similar to the tensioner of FIG. 1-4.
Figure 8:
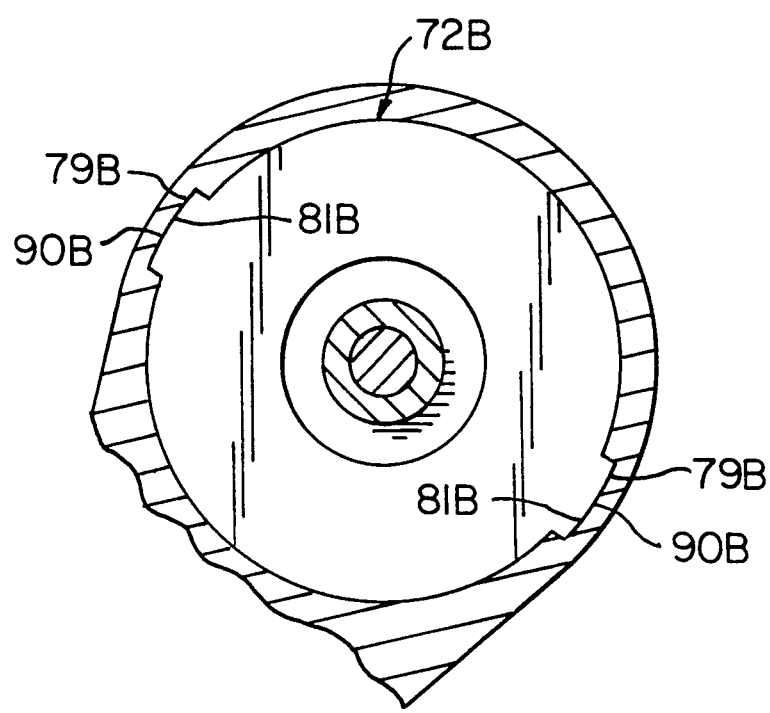
FIG. 8 is a view similar to FIG. 3 and illustrates the support means of FIG. 7.

For example, reference is now made to FIGS. 7 and 8 wherein another unique member or annular pad of this invention is generally indicated by the reference numeral 72B and parts thereof similar to the member 72A previously described are indicated by like reference numerals followed by the reference letter "B".

As illustrated in FIGS. 7 and 8, the member 72B has the projections 79B thereof respectively formed with polysided free ends 90B which, in the embodiment illustrated in FIG. 7, are substantially rectangular. The cooperating openings 81B in the arm 25B respectively have polysided configurations to cooperate with the projections 79B in the manner previously set forth.

Thus, it can be seen that the annular pad of this invention can be guided in its axial movement by the integral guide means thereof with those integral guide means being located in any suitable position thereon and being received in cooperating opening means in the cooperating arm of the belt engaging means to permit that annular pad to rotate in unison with the arm and still be axially movable relative thereto all in the manner previously set forth for the tensioner 20 whereby it is deemed unnecessary to repeat the method of operation of the tensioner 20 when the tensioner 20 utilizes the member 72A with the cooperating arm 25A or utilizes the member 72B with the cooperating arm 25B as the resulting tensioner functions in the same manner as the tensioner 20 when the tensioner 20 utilizes the member 72 in the manner previously set forth.

While the various embodiments of this invention have each been illustrated and described as having a plurality of guide projections arranged in a single circular array on the respective annular pad of friction material, it is to be understood that each annular pad can have only one guide projection thereon or any number of guide projections thereon that are arranged in one or more circular arrays, as desired.

Therefore, it can be seen that this invention not only provides a new tensioner for a power transmission belt that is adapted to be operated in an endless path, but also this invention provides a new method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, said portion of said belt engaging means having opening means therein that receive said guide means therein to guide axial movement of said first part whereby said first part of said dampening means rotates in unison with said portion of said belt engaging means, said annular pad and said guide means of said first part of said dampening means comprising a one-piece homogeneous member, said second part of said dampening means comprising an end plate secured to said shaft means whereby said end plate remains stationary with said support means as said first part rotates with said belt engaging means relative thereto, said end plate having a cylindrical outer periphery, said portion of said belt engaging means having a cylindrical part disposed substantially concentrically about said cylindrical outer periphery of said end plate, said first part of said dampening means comprising a tubular sleeve-like means disposed between said cylindrical outer periphery of said end plate and said cylindrical part of said belt engaging means to act as a bushing therebetween, the improvement wherein said guide means project outwardly from said tubular sleeve-like means, said opening means that receive said guide means therein being disposed in said cylindrical part of said belt engaging means.

2. A tensioner as set forth in claim 1 wherein said guide means comprise a plurality of guide projections disposed in a circular array, said opening means of said belt engaging means comprising a plurality of openings disposed in a like circular array.

3. A tensioner as set forth in claim 2 wherein each said projection has a rounded free end and wherein each said opening has a rounded bottom that receives said rounded free end of its respective projection therein.

4. A tensioner as set forth in claim 2 wherein each said projection has a polysided free end and wherein each said opening has a polysided configuration that receives said polysided free end of its respective projection therein.

5. A tensioner as set forth in claim 1 wherein said tubular sleeve-like means is disposed against said cylindrical outer periphery of said end plate and said cylindrical part of said belt engaging means to tend to prevent cocking of said portion of said belt engaging means on said shaft means.

6. A tensioner as set forth in claim 1 wherein said tubular sleeve-like means extends from one side of said annular pad.

7. A tensioner as set forth in claim 6 wherein said tubular sleeve-like means comprises part of said one-piece homogeneous member.

8. A tensioner as set forth in claim 7 wherein said one-piece homogeneous member is formed of polymeric material.

9. In an annular pad of friction material for a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising said annular pad and a part to be frictionally engaged by said annular pad that is coaxially disposed and axially movable on said shaft means relative to said part, and second spring means urging said pad against said part with a certain spring force, said pad having guide means thereon, said portion of said belt engaging means having opening means therein that receive said guide means therein to guide axial movement of said pad whereby said pad rotates in unison with said portion of said belt engaging means, said annular pad and said guide means comprising a one-piece homogeneous member, said part of said dampening means comprising an end plate secured to said shaft means whereby said end plate remains stationary with said support means as said pad rotates with said belt engaging means relative thereto, said end plate having a cylindrical outer periphery, said portion of said belt engaging means having a cylindrical part disposed substantially concentrically about said cylindrical outer periphery of said end plate, said pad comprising a tubular sleeve-like means disposed between said cylindrical outer periphery of said end plate and said cylindrical part of said belt engaging means to act as a bushing therebetween, the improvement wherein said guide means project outwardly from said tubular sleeve-like means, said opening means that receive said guide means therein being disposed in said cylindrical part of said belt engaging means.

10. A pad as set forth in claim 9 wherein said guide means comprise a plurality of guide projections disposed in a circular array, said opening means of said belt engaging means comprising a plurality of openings disposed in a like circular array.

11. A pad as set forth in claim 10 wherein each said projection has a rounded free end and wherein each said opening has a rounded bottom that receives said rounded free end of its respective projection therein.

12. A pad as set forth in claim 10 wherein each said projection has a polysided free end and wherein each said opening has a polysided configuration that receives said polysided free end of its respective projection therein.

13. A pad as set forth in claim 9 wherein said tubular sleeve-like means extends from one side of said annular pad.

14. A pad as set forth in claim 13 wherein said tubular sleeve-like means comprises part of said one-piece homogeneous member.

15. A pad as set forth in claim 14 wherein said one-piece homogeneous member is formed of polymeric material.

16. In a method of making a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, said portion of said belt engaging means having opening means therein that receive said guide means therein to guide axial movement of said first part whereby said first part of said dampening means rotates in unison with said portion of said belt engaging means, said annular pad and said guide means of said first part of said dampening means comprising a one-piece homogeneous member, said second part of said dampening means comprising an end plate secured to said shaft means whereby said end plate remains stationary with said support means as said first part rotates with said belt engaging means relative thereto, said end plate having a cylindrical outer periphery, said portion of said belt engaging means having a cylindrical part disposed substantially concentrically about said cylindrical outer periphery of said end plate, said first part of said dampening means comprising a tubular sleeve-like means disposed between said cylindrical outer periphery of said end plate and said cylindrical part of said belt engaging means to act as a bushing therebetween, the improvement comprising the steps of forming said guide means to project outwardly from said tubular sleeve-like means, and forming said opening means that receive said guide means therein to be disposed in said cylindrical part of said belt engaging means.

* * * * *